United States Patent [19]
Kliman et al.

[11] Patent Number: 4,994,698
[45] Date of Patent: Feb. 19, 1991

[54] VIBRATORY LINEAR MOTOR SYSTEM

[75] Inventors: Gerald B. Kliman, Schenectady; Donald W. Jones, Burnt Hills; Russell E. Tompkins, Scotia, all of N.Y.; Roger W. Brockett, Lexington, Mass.

[73] Assignee: General Electric Company, Schenectady, N.Y.

[21] Appl. No.: 537,847

[22] Filed: Jun. 13, 1990

[51] Int. Cl.$^5$ .................. H02K 7/06; H02K 7/065
[52] U.S. Cl. .................. 310/81; 310/326; 318/135
[58] Field of Search .......... 310/12, 20, 37, 51, 310/80, 81, 326, 328; 318/9, 135

[56] References Cited

U.S. PATENT DOCUMENTS

| | | |
|---|---|---|
| 3,902,084 | 8/1975 | May, Jr. .................. 310/328 |
| 4,433,273 | 2/1984 | Petersen .................. 310/20 |
| 4,795,956 | 1/1989 | Beck .................. 318/135 |

FOREIGN PATENT DOCUMENTS

| | | |
|---|---|---|
| 62-23381 | 1/1987 | Japan .................. 310/328 |
| 154077 | 6/1988 | Japan .................. 310/81 |

OTHER PUBLICATIONS

R. W. Brockett, "On the Control of Vibratory Actuators", Proceedings of the 1987 IEEE Conference on Decision and Control, Dec. 1987, pp. 1-5.

S. Uheha, "Present State of the Art of Ultrasonic Motors", Proceedings of the 9th Symposium on Ultrasonic Electronics, Sendai 1988 Japanese Journal of Applied Physics, vol. 28 (1989), Supplement 28-1, pp. 3-6.

M. Kurosawa et al., Proceedings of the 9th Symposium on Ultrasonic Electronics, Sendai 1988 Japanese Journal of Applied Physics, vol. 28 (1989) Supplement 28-1, pp. 158-160.

R. W. Brockett, "On the Rectification of Vibratory Motion", Proceedings of the 1989 IEEE Conference on Micromechanical Systems, Feb. 20-22, 1989, pp. 1-4.

J. L. Butler, "Application Manual for the Design of Etrema Terfenol-D Magnetostrictive Transducers", 1988.

*Primary Examiner*—Steven L. Stephan
*Assistant Examiner*—D. L. Rebsch
*Attorney, Agent, or Firm*—Jill M. Breedlove; James C. Davis, Jr.; Marvin Snyder

[57] ABSTRACT

A vibratory linear motor system employs a comb-shaped electromagnet to excite transverse mechanical oscillations of a relatively thin, spring-like beam. The electromagnet establishes an approximate standing wave on the beam for which brakes mounted on either side of the beam provide independently established boundary conditions and produce rectified linear motion thereof. The brakes may be electromagnetically, magnetostrictively, or piezoelectrically actuated. An electronic control provides modulated currents to the exciter electromagnet and the brakes in order to control the rectified linear motion of the beam.

13 Claims, 8 Drawing Sheets

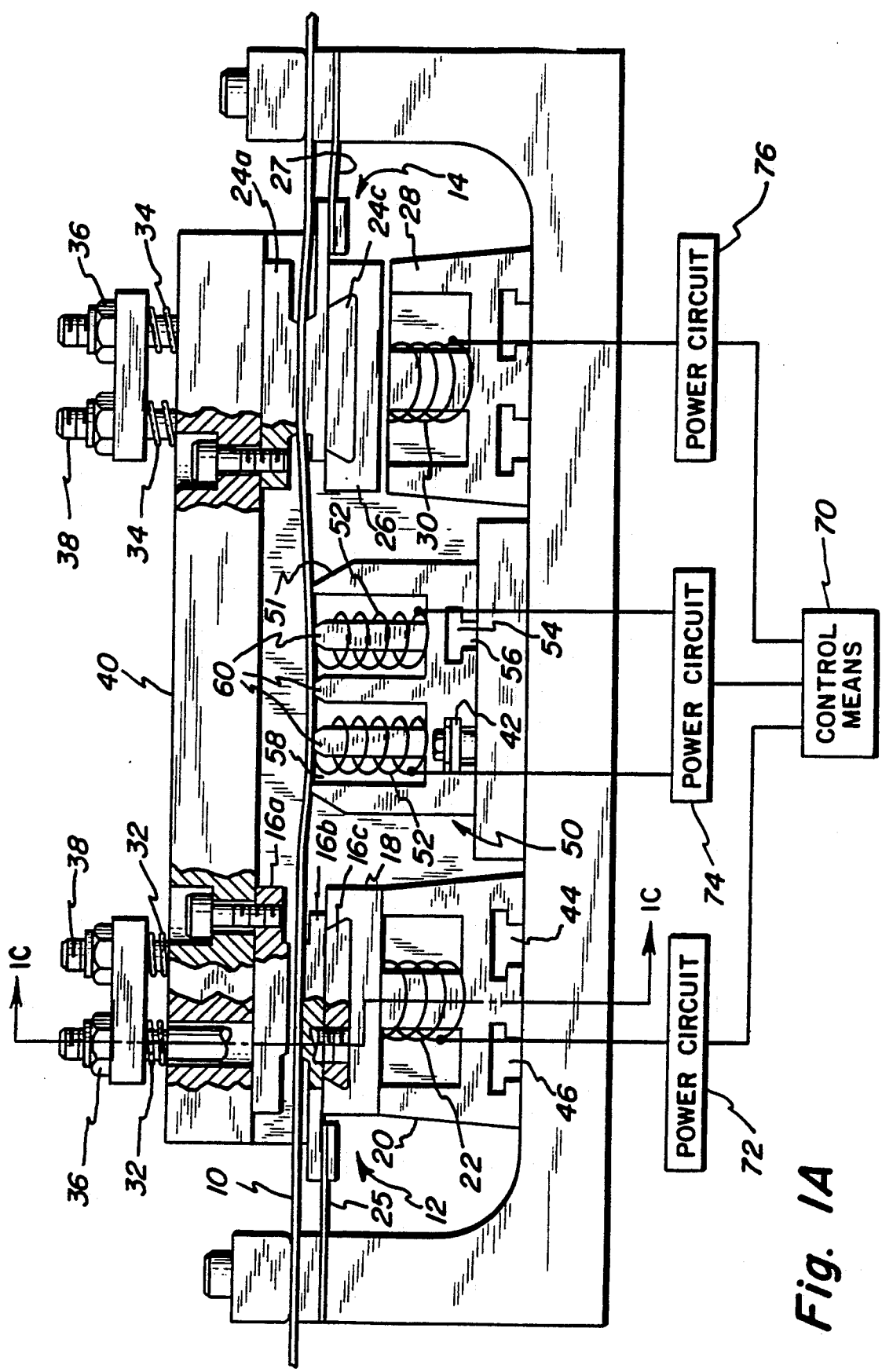

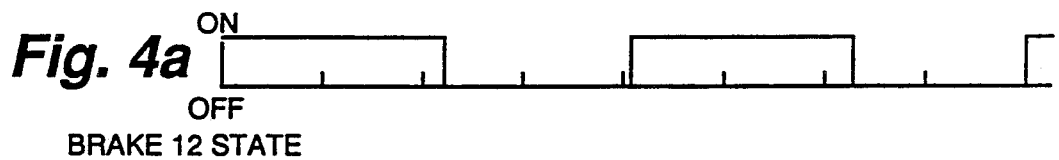
Fig. 4a BRAKE 12 STATE
Fig. 4b BRAKE 14 STATE
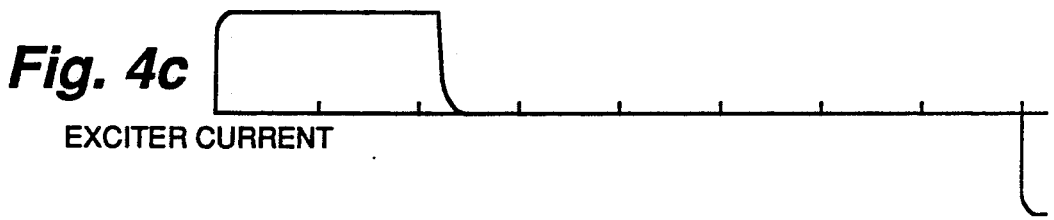
Fig. 4c EXCITER CURRENT
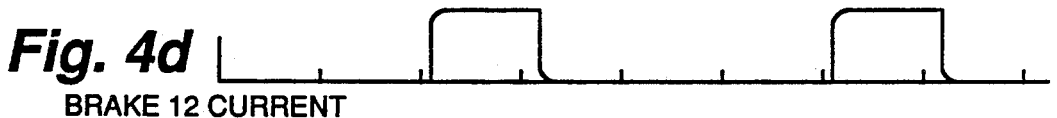
Fig. 4d BRAKE 12 CURRENT
Fig. 4e BRAKE 14 CURRENT
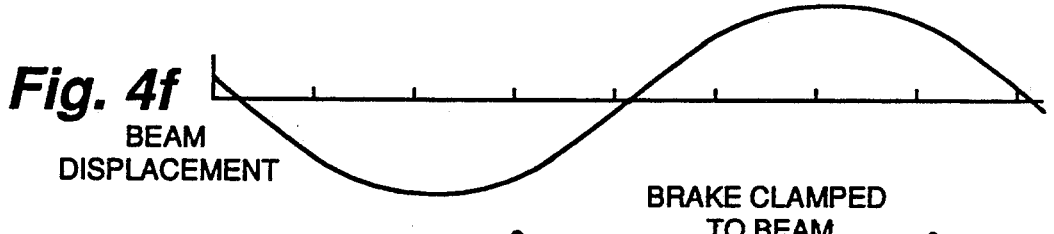
Fig. 4f BEAM DISPLACEMENT
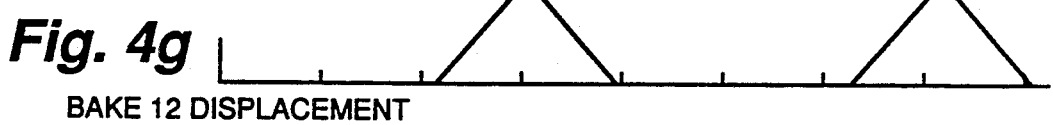
Fig. 4g BAKE 12 DISPLACEMENT
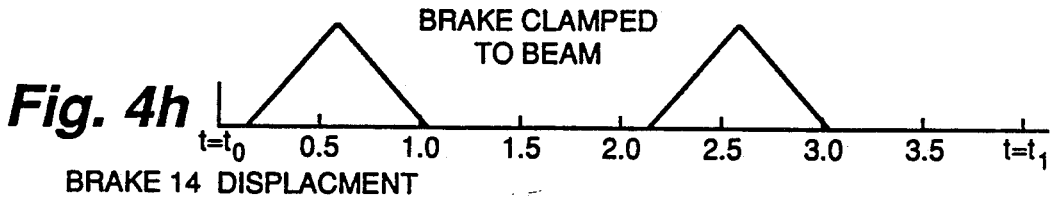
Fig. 4h BRAKE 14 DISPLACMENT

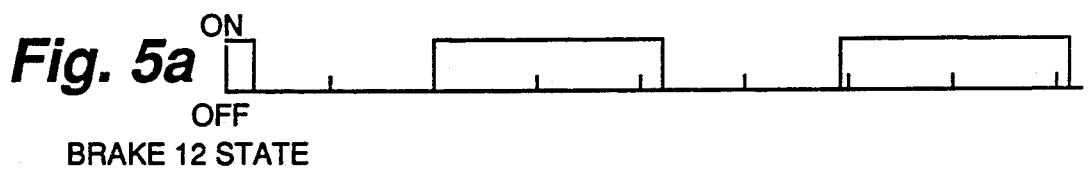
Fig. 5a BRAKE 12 STATE
Fig. 5b BRAKE 14 STATE
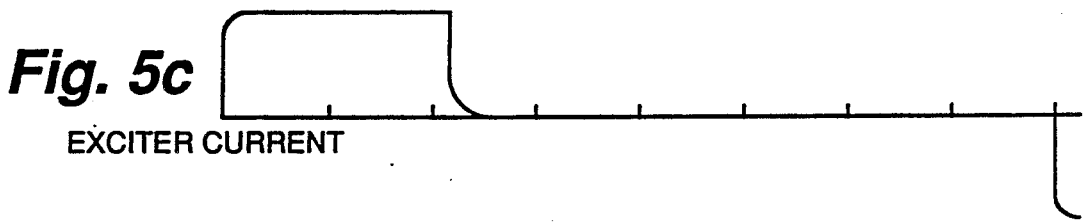
Fig. 5c EXCITER CURRENT
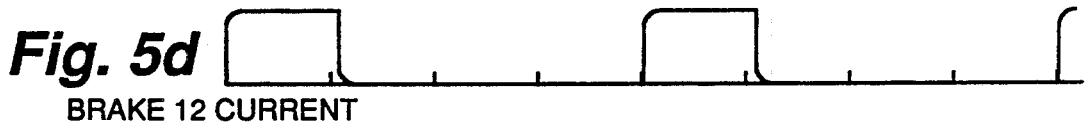
Fig. 5d BRAKE 12 CURRENT
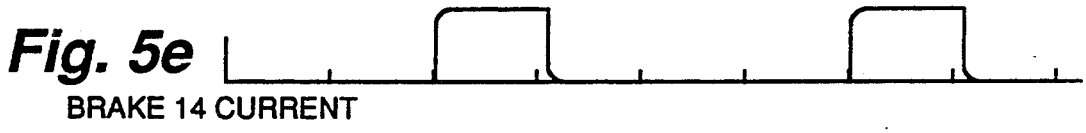
Fig. 5e BRAKE 14 CURRENT
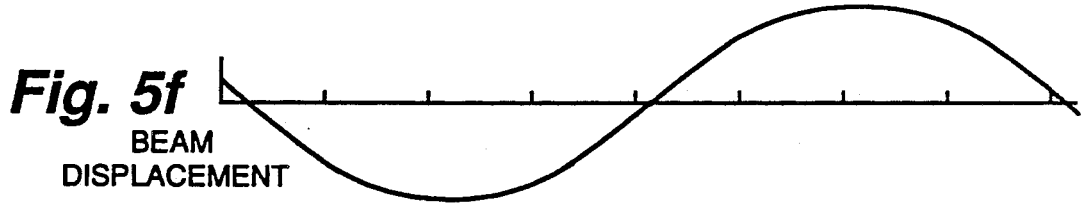
Fig. 5f BEAM DISPLACEMENT
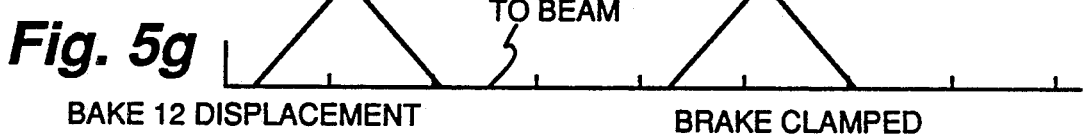
Fig. 5g BAKE 12 DISPLACEMENT
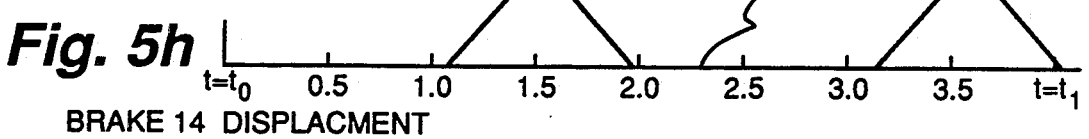
Fig. 5h BRAKE 14 DISPLACMENT

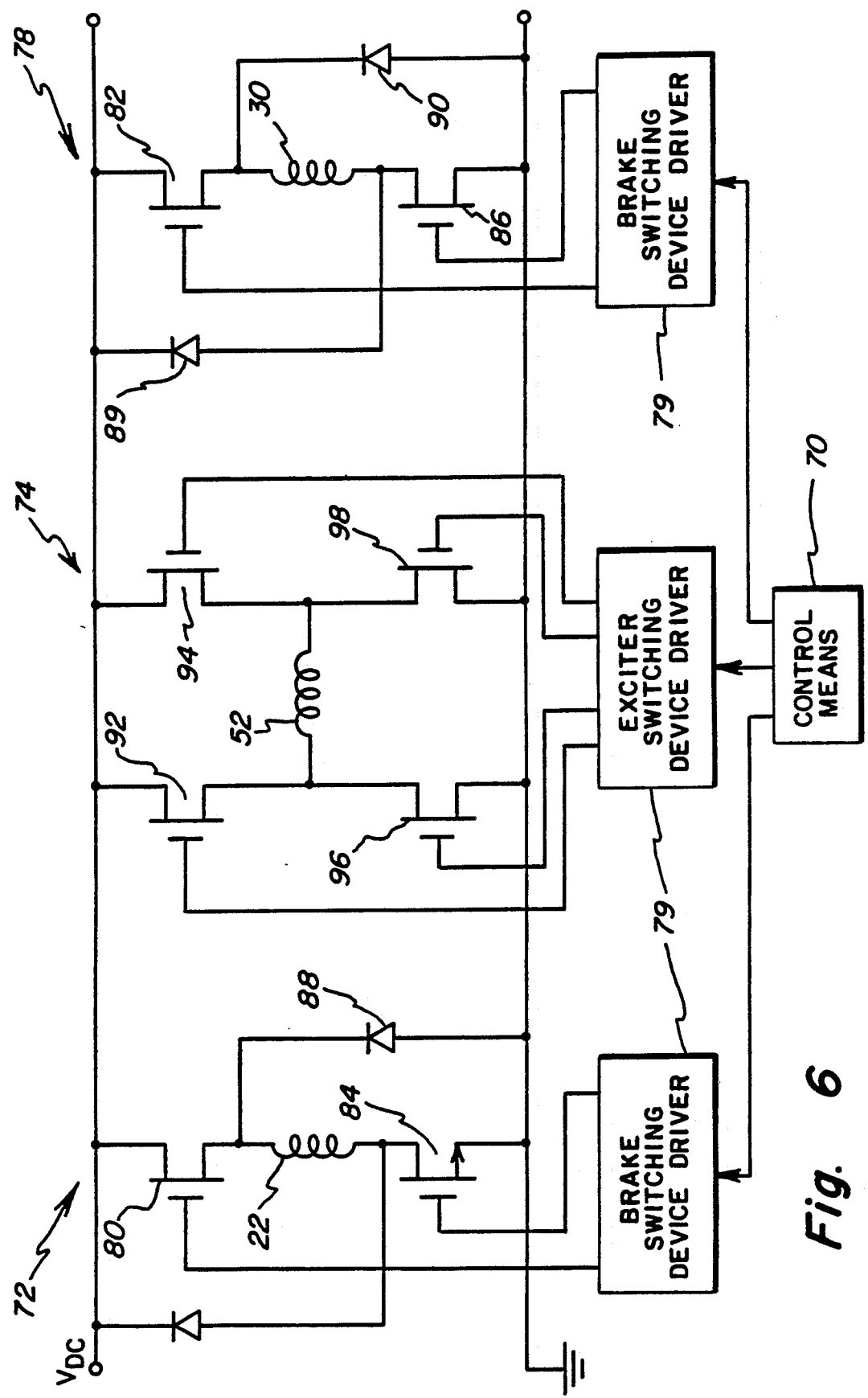

VIBRATORY LINEAR MOTOR SYSTEM

FIELD OF THE INVENTION

The present invention relates generally to vibratory linear motors. More particularly, the present invention relates to a vibratory linear motor system employing electromagnetic excitation and control.

BACKGROUND OF THE INVENTION

Mechanical rectification involves converting reciprocating motion to either rotational motion or rectilinear motion. The classic mechanical rectifier is a piston/crankshaft mechanism. To produce mechanical advantage in the classic system, gearing and lubrication are required, thus making such a system unsuitable for applications requiring both a compact mechanism and a high degree of precision, such as robotics applications, e.g. prostheses and other high force-to-weight ratio applications. Such a system is likewise unsuitable for applications involving high-temperature or vacuum environments. Recently, however, vibratory motors, which may be well-suited to such applications, have been considered theoretically by R. W. Brockett in the paper entitled "On The Control of Vibratory Actuators", Proceedings of the 1987 IEEE Conference on Decision and Control, December 1987, pages 1418–1422, which is hereby incorporated by reference.

Linear motors employing piezoelectric transducers are described in a paper entitled "Present State of the Art of Ultrasonic Motors", by S. Uheha, Proceedings of the 9th Symposium on Ultrasonic Electronics, Sendai 1988 Japanese Journal of Applied Physics, Vol. 28 (1989) Supplement 28-1, pp. 3–6. Such motors rely on intermittent frictional contact between a rotor movable along a contacting surface and a vibrating stator, which is excited by piezoelectric elements, resulting in the propagation of a travelling wave along the contacting surface. The contacting surface of the motor follows an elliptic path which results in unidirectional motion. In a paper entitled "Hybrid Transducer Type Ultrasonic Linear Motor", by M. Kurosawa et al., Proceedings of the 9th Symposium on Ultrasonic Electronics, Sendai 1988 Japanese Journal of Applied Physics, Vol. 28 (1989) Supplement 28-1, pp. 158–163, a different mode of operation is described wherein piezoelectric transducers are employed directly as extenders and clamps in order to generate linear motion. Disadvantageously, since piezoelectric materials comprise the primary moving, or "working", elements of such motors, the power output capability is generally limited by the energy density and strain of piezoelectric materials.

Therefore, it is desirable to provide a new and improved linear motor that is practical for applications involving a wide range of load levels and is simple in construction.

OBJECTS OF THE INVENTION

Accordingly, it is an object of the present invention to provide a new and improved vibratory linear motor system.

Another object of the present invention is to provide a vibratory linear motor system employing electromagnetic excitation and control.

Still another object of the present invention is to provide a high force, low speed, vibratory linear motor suitable for use in robotics applications and applications involving extreme environments, i.e. high-temperature or vacuum environments.

SUMMARY OF THE INVENTION

The foregoing and other objects of the present invention are achieved in a vibratory linear motor system employing electromagnetic excitation and control. An electromagnetic excitation means is used to induce transverse mechanical oscillations of a relatively thin, spring-like beam mounted between a pair of clamping means. The electromagnetic excitation means preferably comprises a comb-shaped, or multi-poled, electromagnet disposed centrally with respect to the clamping means. In this configuration, the clamping means provide boundary conditions for a standing wave vibration established on the beam by the electromagnetic excitation means. In operation, the clamping means are suitably controlled to produce linear motion of the beam in either a right-hand or left-hand direction, as desired, as the beam oscillates, hence converting oscillating, or reciprocating, motion to rectilinear motion. According to a preferred embodiment, the clamping means comprise left-hand and right-hand electromagnetically actuated brakes which are normally held on, i.e. clamped to the beam, by a high force spring system. Alternative embodiments of the clamping means include magnetostrictive and piezoelectric brakes. Approximately rectangular current pulses are applied to the comb-shaped electromagnet and brake windings in such manner as to produce mechanical oscillations of the beam and to control the rectified linear motion thereof. Alternatively, a sine wave excitation may be provided to the comb-shaped electromagnet, while approximately rectangular current pulses are applied to the brake windings. The magnitudes, phases and waveforms of the signals used to excite the electromagnet and brakes may be controlled to achieve optimum operation.

BRIEF DESCRIPTION OF THE DRAWINGS

The features and advantages of the present invention will become apparent from the following detailed description of the invention when read with the accompanying drawings in which:

FIG. 1A is a front schematic illustration of a vibratory linear motor system in accordance with a preferred embodiment of the present invention;

FIG. 4 is a graphical illustration useful in understanding vibratory linear motor operation resulting in rectilinear motion in a leftward direction in accordance with a preferred embodiment of the present invention;

FIG. 5 is a graphical illustration useful in understanding vibratory linear motor operation resulting in rectilinear motion in a rightward direction in accordance with a preferred embodiment of the present invention;

FIG. 6 is a schematic diagram of power circuits useful in the electromagnetic control of FIG. 1A;

DETAILED DESCRIPTION OF THE INVENTION

Figure 1B:
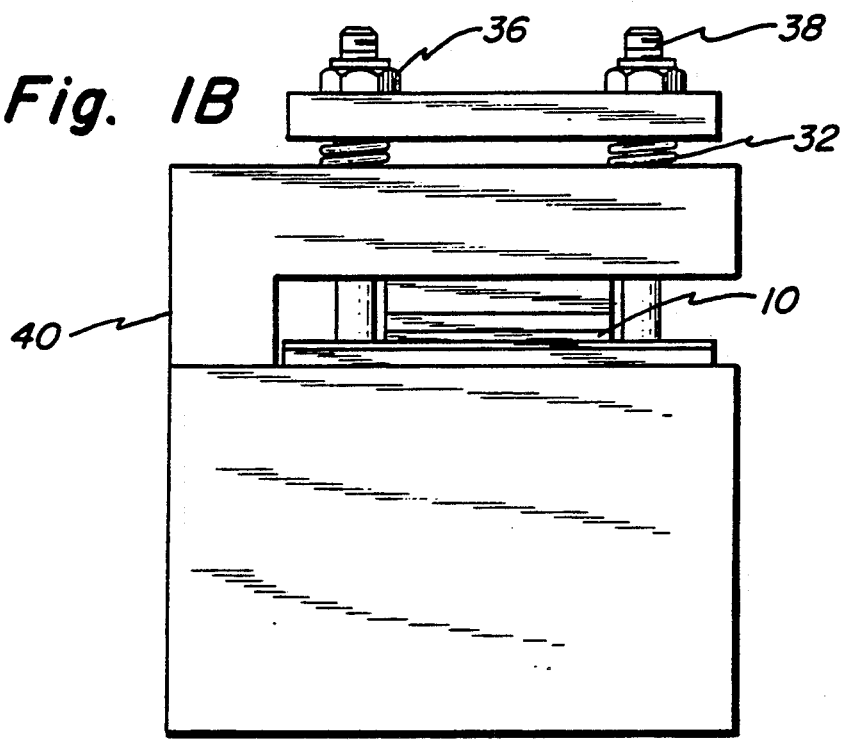
FIG. 1B is an end view of the vibratory linear motor of FIG. 1A.
Figure 1C:
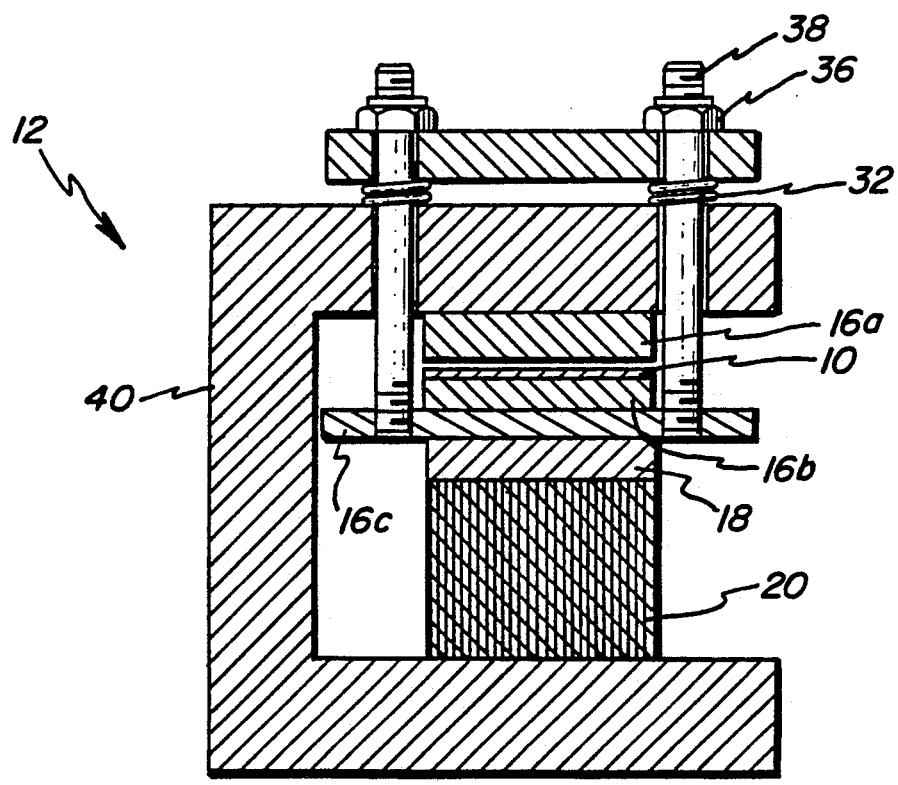
FIG. 1C is a cross sectional view of the vibratory linear motor of FIG. 1A taken along line C—C.

FIG. 1 is a schematic diagram of a vibratory linear motor system in accordance with a preferred embodiment of the present invention. A relatively thin, spring-like beam 10 is mounted between a pair of clamping means which preferably comprise electromagnetically actuated brakes 12 and 14. An exemplary beam comprises a standard spring steel having suitable mechanical and magnetic properties, such as AISI 1095 steel. Brake 12 comprises a pair of brake shoes 16a and 16b, a laminated armature 18, and a laminated core 20 with a coil 22 wound thereon; and brake 14 similarly comprises a pair of brake shoes 24a and 24b, a laminated armature 26, and a laminated core 28 with a coil 30 wound thereon. Dovetail clamps 16c and 24c respectively hold armatures 18 and 26 clamped to brake shoes 16b and 24b, respectively. The brake shoes are respectively restrained horizontally by thin flexures 25 and 27, e.g. comprising steel, which, however, allow movement in the vertical direction. As shown, cores 20 and 28 are each preferably E-shaped with coils 22 and 30 respectively wound around the respective middle leg thereof. Springs 32 and 34 hold brakes 12 and 14, respectively, clamped to beam 10 until a current pulse is applied to the corresponding coil 22 and 30, respectively, as will be explained hereinafter. In FIG. 1A, brake 12 is shown as being disengaged by virtue of the effect of energizing coil 22 which results in movement of armature 18 toward core 20, while brake 14 is shown as being engaged, i.e. clamped to beam 10. Nuts 36 and bolts 38 hold springs 32 and 34 to a generally C-shaped motor frame 40. The cores of brakes 12 and 14 are mounted to motor frame 40 by means of straps (not shown) in strap slots 44. As illustrated, strap slots 44 are distinct from the spaces which separate the three legs of the E-shaped electromagnetically actuated brakes 12 and 14 from each other. Furthermore, each strap slot 44 includes a flux barrier opening 46 in order to avoid providing a closed flux path around the strap in the yoke of the core, thus reducing core losses and decreasing response time by preventing magnetic flux from linking the straps.

An electromagnetic excitation means, which preferably comprises an electromagnet 50 having a laminated core 51 with a pair of exciter coils 52 wound thereon, is situated between left-hand and right-hand electromagnetically actuated brakes 12 and 14. Electromagnet 50 induces mechanical oscillations of beam 10 by alternately magnetically attracting and releasing the beam. In particular, the electromagnetic excitation means establishes a nearly standing wave vibration on the beam for which the clamping means provide independently established boundary conditions. As shown, electromagnet 50 is preferably comb-shaped, thereby distributing the total ampere-turns over a relatively large span of the beam in order to match the flux carrying capability of the beam. In this way, since spring steel has a relatively low magnetic permeability and exhibits skin saturation, magnetic flux is distributed over a relatively large surface area of beam 10, thus maximizing the attainable electromagnetic force on the beam. Furthermore, by so distributing the ampere-turns, the motor cools more quickly than if the ampere-turns were concentrated in a smaller area as in, for example, a U-shaped electromagnet.

Figure 1D:
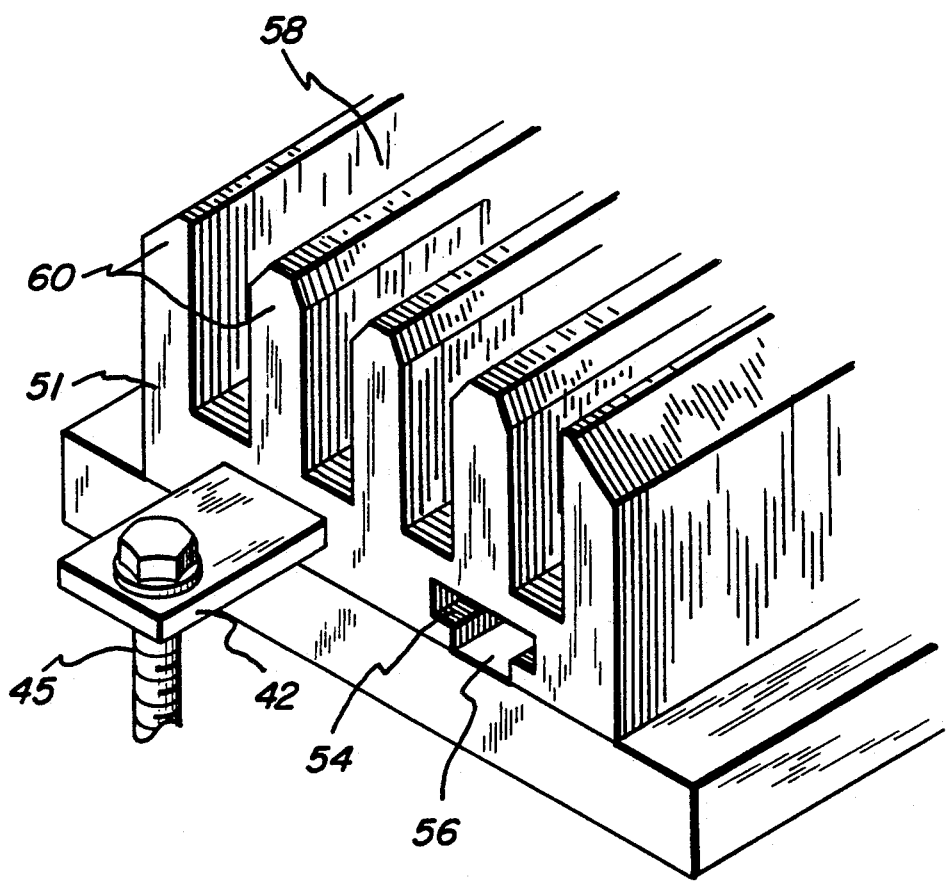
FIG. 1D is a partial perspective view of the electromagnetic excitation means of the vibratory linear motor system of FIG. 1A illustrating mounting straps and strap slots useful in a preferred embodiment of the present invention.

Similar to brakes 12 and 14, a preferred embodiment of comb-shaped electromagnet 50 has strap slots 54 for receiving straps 42 to mount electromagnet 50 to motor frame 40, as illustrated in detail in FIG. 1D wherein a screw 45 is shown for fastening strap 42 to core 51. Each strap slot 54 includes a flux barrier opening 56 in order to avoid providing a closed flux path around the strap in the yoke of the core, thus reducing core losses and decreasing response time by preventing magnetic flux from linking the straps. As shown in FIGS. 1A and 1D, strap slots 54 are distinct from comb slots 58 which separate the teeth 60 of comb-shaped electromagnet 50 from each other, thus preventing magnetic flux from linking the straps and avoiding the need for insulation between the straps and the frame. Furthermore, teeth 60 each have a tapered end in order to maximize the airgap peak flux density at the points of maximum beam deflection, thereby maximizing the airgap force which is a function of the square of the magnetic flux density. As a result, the electromagnetic force on the beam is increased, even under flux-limited operating conditions resulting from saturation of the beam. On the other hand, teeth 60 are wider toward the yoke of core 51 in order to reduce core losses and to provide a more rigid structure. In addition, core 51 has a slightly curved contour (exaggerated in FIG. 2) which is shaped so as to substantially conform to beam 10 when the beam is maximally deflected in order to minimize the airgap between the exciter electromagnet and the beam.

Figure 2:
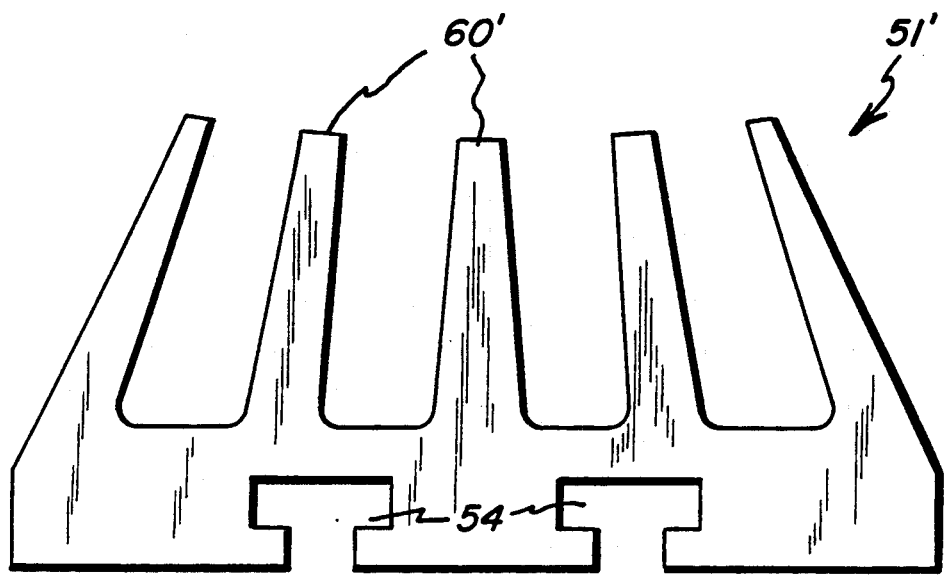
FIG. 2 is a side view of an alternative embodiment of the core of an electromagnet comprising electromagnetic excitation means in accordance with a preferred embodiment of the present invention.
Figure 3:
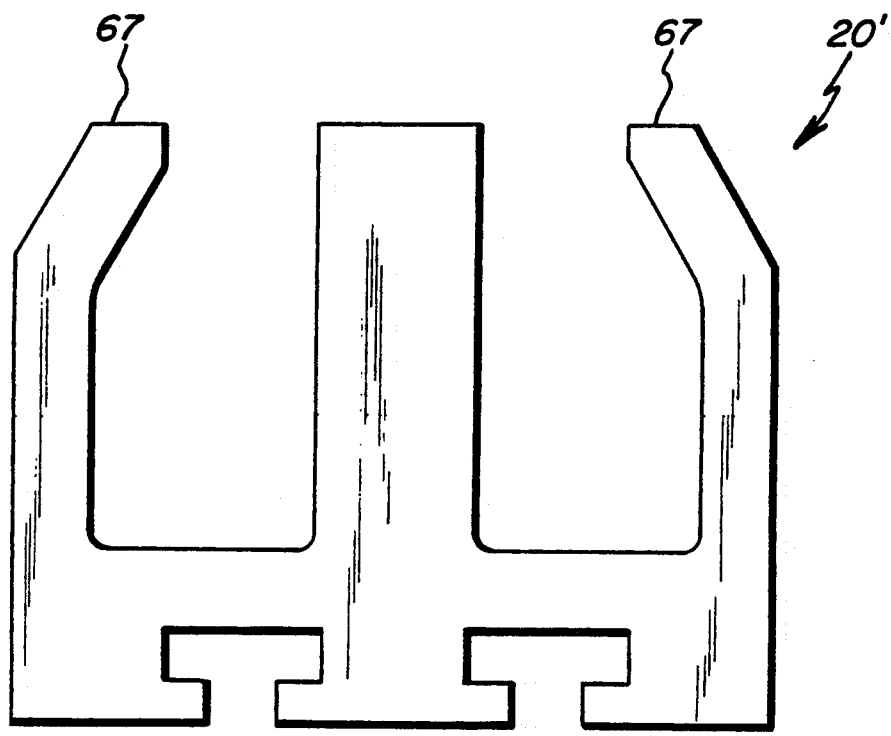
FIG. 3 is a side view of an alternative embodiment of the core of an electromagnetically actuated brake useful in the present invention.

FIG. 2 illustrates an alternative embodiment of the exciter electromagnet core, designated as core 51'. As illustrated, teeth 60' of core 51' are tapered and tilted inwardly so as to provide more space for a larger electromagnet coil (not shown), thereby reducing coil losses, while maintaining substantially the same magnetic flux configuration within the airgap. Based upon the same principles, an alternative embodiment of cores 20 and 28 of electromagnetic brakes 12 and 14, respectively, is illustrated in FIG. 3 as brake core 20'. As shown, the outer legs 67 of the substantially E-shaped core 20' are tilted inwardly at the top portions thereof.

In operation, an electronic control means 70 (FIG. 1A) provides current pulses via power circuits 72, 74, and 76 to brake 12, electromagnet 50, and brake 14, respectively, in order to induce mechanical oscillations of beam 10 and to control the motion thereof. For leftward motion of beam 10, for example, power is initially supplied to electromagnet 50 and right-hand brake 14, thus exciting electromagnet 50 and disengaging brake 14. The resulting transverse deflection of beam 10 coupled with the opening of right-hand brake 14 causes the rightmost end of beam 10 to move inwardly, thereby increasing the length of beam 10 between the brakes. Right-hand brake 14 and electromagnet 50 are subsequently engaged and de-energized, respectively, and left-hand brake 12 is disengaged by supplying power thereto, forcing the leftmost end of beam 10 to move outward through open brake 12, i.e. to the left. The cycle is completed by closing, i.e. de-energizing, left-hand brake 12.

According to one embodiment of the present invention, the current pulses are regulated by control means 70 in a manner well-known in the art, such as by pulse width modulation (PWM) or hysteresis current regulation. In a preferred embodiment, for maximum beam deflection per ampere of drive current, the motor is operated using a rectangular pulse excitation just below the resonant frequency of the beam. FIG. 4 illustrates waveforms useful in describing the operation of the vibratory linear motor of FIG. 1. In particular, for illustrative purposes only, rectilinear motion to the left will be described in detail. Initially, at time $t=t_0$, as illustrated in FIGS. 4a and 4b, electromagnetic brakes 12 and 14 are clamped to beam 10 by the action of springs 32 and 34, respectively. As shown in FIGS. 4c and 4f, respectively, when an exciter current pulse is applied to electromagnet 50, the beam moves down. Substantially simultaneously with application of the exciter current pulse (or after a short time delay), a current pulse is applied to right-hand brake 14 (FIG. 4e) which causes armature 26 to move toward core 28 (FIG. 4h). Typically, there is a short time delay, e.g. 40-50 microseconds, after application of the brake current pulse and before the brake releases. This time delay is caused by finite beam stiffness in addition to surface irregularities, or roughness, on beam 10 and brake shoe 24a which must be cleared as brake shoe 24b moves away from beam 10 before brake 14 can release. The brake 14 current pulse is turned off when armature 26 hits the core, or, preferably, slightly earlier. As shown in FIG. 4h, armature 26 then begins to move back toward the beam. When right-hand brake 14 makes contact with beam 10, it clamps on or engages the beam (FIG. 4b). Concurrently with clamping on of the right-hand brake, a current pulse is applied to left-hand brake 12 (FIG. 4d). Like brake 14, as described hereinabove, there is a time delay after application of the current pulse before brake 12 releases. Thus, there is a natural overlapping time period when both brakes 12 and 14 are engaged, as illustrated in FIGS. 4a and 4b. (For some applications, a greater time delay may be desirable.) Such an overlap avoids uncontrolled motion of the beam in case both brakes were released simultaneously. At approximately the peak amplitude of the downward motion of the beam (FIG. 4f) and after the short off-state time delay of left-hand brake 12 (FIGS. 4a and 4d), the exciter current pulse is turned off (FIG. 4c). As a result, the beam begins upward motion (FIG. 4f). At approximately the peak amplitude of the beam's upward motion, right-hand brake 14 is released (FIG. 4b) after left-hand brake 12 is engaged (FIG. 4a). The beam then resumes downward motion in accordance with its natural behavior, as illustrated in FIG. 4f. At approximately the time when the beam reaches its initial position, i.e. at time $t_1$, another exciter current pulse is applied (FIG. 4c). According to one preferred embodiment of the present invention, this second exciter current pulse has the opposite polarity from the first exciter current pulse in order to ensure that the beam does not become magnetized so that particles are not attracted to the beam, thus avoiding unnecessary wear and tear of the brakes.

The hereinabove described process repeats continuously to produce controlled rectilinear motion to the left. For motion to the right, operation of the motor is the same, except that electromagnetic brakes 12 and 14 are turned on and off in the opposite order from that described hereinabove. Waveforms useful in understanding this controlled rightward motion are illustrated in FIG. 5.

Control means 70 and associated power circuits 72, 74, and 76 each may be of a conventional type well-known in the art, such as, for example, those employed in a switched reluctance motor or dc motor control system. FIG. 6 illustrates exemplary power circuits 72, 74 and 76 useful in the electronic control system of the present invention. Each power circuit is coupled to a dc source $V_{DC}$, such as a battery or a rectified ac source and is controlled independently by control means 70 via conventional switching device drivers 79 in a manner well-known in the art. An alternative control means may comprise conventional waveform generators and linear amplifiers (not shown).

As shown in FIG. 6, power circuits 72 and 76 are coupled to brake coils 22 and 30, respectively, for driving the corresponding brake. In particular, brake coils 22 and 30 are respectively connected in series with an upper switching device 80 and 82 and a lower switching device 84 and 86 and also are coupled to the dc source by a pair of flyback diodes 87-88 and 89-90, respectively. The upper and lower switching devices are illustrated as field effect transistors, but other suitable switching devices may be used, such as bipolar junction transistors, gate turn-off thyristors, or insulated gate bipolar transistors. Such power circuits are described with reference to a switched reluctance motor control system in commonly assigned, copending U.S. patent application Ser. No. 350,884 of S. R. MacMinn and F. G. Turnbull, filed May 12, 1989, now allowed, which patent application is hereby incorporated by reference.

Power circuit 74 is coupled to exciter coil 52 for driving the exciter electromagnet. In FIG. 6, power circuit 76 is illustrated as comprising an H-bridge, or full-bridge, power circuit having two legs wherein an upper switching device 92 and 94 is connected in series with a lower switching device 96 and 98, and exciter coil 52 is coupled between the junctions joining the switching devices in each leg. Although operation of the vibratory linear motor system of the present invention has been described as employing a rectangular current pulse excitation, it is to be understood that exciter electromagnet 50 (FIG. 1) may alternatively be driven in a pulse width modulation (PWM) mode for sine wave excitation. Operation of a full-bridge power circuit in a PWM mode using either a rectangular pulse or sine wave excitation is a matter well-known in the art. By using a sine wave to excite electromagnet 50, the linear motor may be operated at any drive frequency, but at reduced exciter effectiveness than that obtained by operating the exciter electromagnet using a rectangular current pulse mode just below the resonant frequency of the beam, as described hereinabove. That is, by using a rectangular current pulse mode to excite oscillations of the beam just below the resonant frequency thereof, the beam will oscillate in accordance with its natural behavior. On the other hand, using a sine wave excitation causes the beam to follow the sine wave, resulting in decreased motor output. In either case, however, the clamping means are preferably driven using a rectangular pulse excitation.

Figure 7:
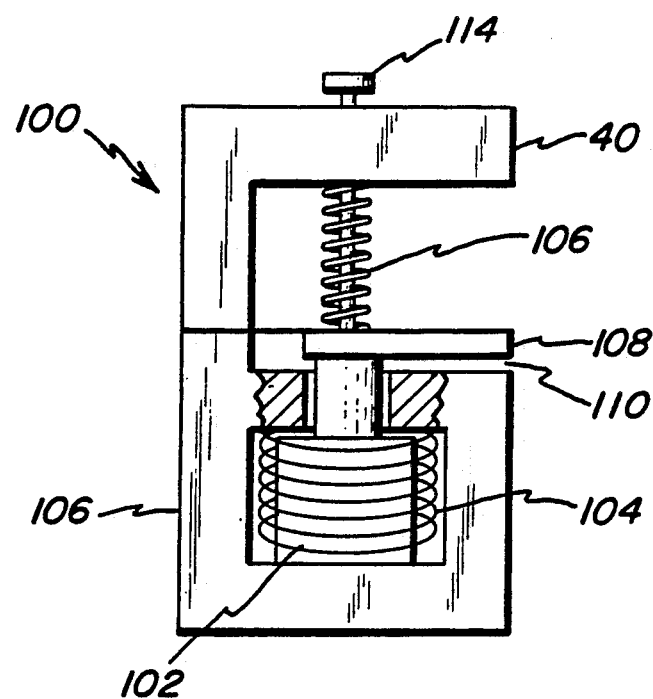
FIG. 7 is a schematic illustration of an alternative embodiment of clamping means useful in the vibratory linear motor system of the present invention.

In an alternative embodiment of the present invention, the left-hand and right-hand clamping means comprise electromagnetically operated magnetostrictive brakes. FIG. 7 illustrates an exemplary magnetostrictive brake 100 which may be used instead of electromagnetic brakes 12 and 14 of FIG. 1. Magnetostrictive brake 100 comprises a rod 102 made of a magnetostrictive material, such as that sold under the trademark Terfenol-D by Edge Technologies, Inc. Terfenol-D magnetostrictive material is described in Application Manual for the Design of Etrema Terfenol-D Magnetostrictive Transducers, by Dr. John L. Butler, 1988, which manual is hereby incorporated by reference. A brake coil 104 is wound around magnetostrictive rod 102, which rod is mounted in a relatively soft iron core 106 that provides a closed magnetic circuit. A clamp lever arm 108, or armature, is mounted on top of rod 102. Like electromagnetically actuated brakes 12 and 14 (FIG. 1), magnetostrictive brake 100 is normally engaged, hence clamping beam 10 (FIG. 1) which is situated in slot 110. Magnetostrictive brake 100 is released by supplying current to coil 104 which causes the magnetostrictive material comprising rod 102 to lengthen axially, thereby lifting clamp lever arm 108 against a spring 106, which is fixed to motor frame 40 by a nut 114, so as to release the beam for movement in slot 110.

Figure 8:
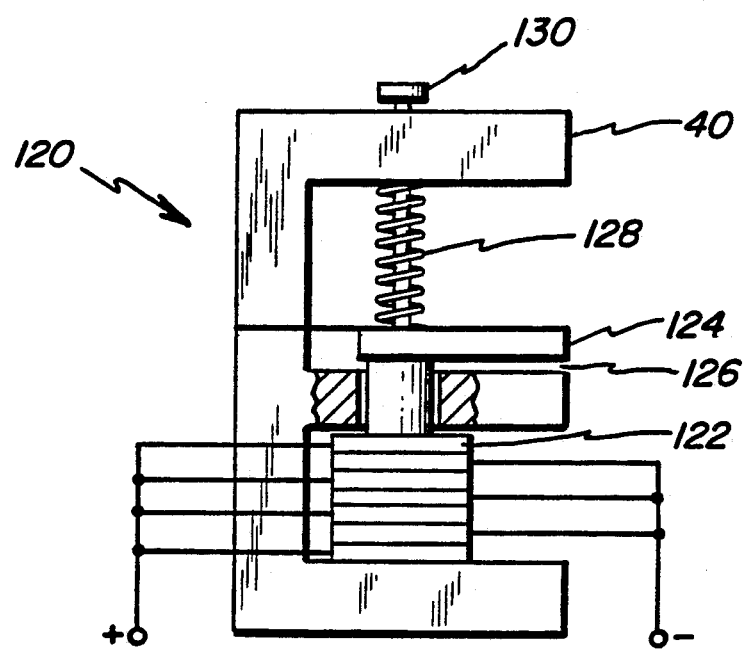
FIG. 8 is a schematic illustration of still another alternative embodiment of clamping means useful in the vibratory linear motor system of the present invention.

FIG. 8 illustrates another alternative embodiment of clamping means comprising a piezoelectric brake 120. In particular, piezoelectric brake 120 comprises a stack 122 of a piezoelectric material. A clamp lever arm 124, or armature, is mounted on top of piezoelectric stack 122. Like electromagnetically actuated brakes 12 and 14 (FIG. 1), piezoelectric brake 120 is normally engaged, hence clamping beam 10 (FIG. 1) which is situated in a slot 126. When a potential difference is applied to the piezoelectric stack 122, it lengthens axially, causing clamp lever arm 124 to move against a spring 128, which is fixed to motor frame 40 by a nut 130. As a result, the beam is released for movement in slot 126.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A vibratory linear motor system, comprising:
a spring-like beam;
electromagnetic excitation means for exciting and maintaining periodic transverse mechanical oscillations of said beam so as to produce approximately a standing wave therealong;
clamping means for selectively restricting translational motion of either end of said beam; and
electronic control means for controlling said electromagnetic excitation means and said clamping means by providing currents thereto so as to convert said transverse oscillations of said beam into rectilinear motion.

2. The linear motor system of claim 1 wherein said electromagnetic excitation means comprises a substantially comb-shaped electromagnet including a a plurality of teeth and a yoke.

3. The linear motor system of claim 2 wherein said yoke includes at least one slot for receiving a strap for mounting said electromagnet to a motor frame.

4. The linear motor system of claim 2 wherein said teeth each have a tapered end.

5. The linear motor system of claim 2 wherein said comb-shaped electromagnet has a curved contour which substantially conforms to said beam when said beam is maximally deflected so as to minimize any air-gap between said beam and said electromagnet.

6. The linear motor system of claim 2 wherein:
said electromagnet is disposed centrally with respect to said beam; and
said clamping means comprises a right-hand electromagnetically operated brake and a left-hand electromagnetically operated brake.

7. The linear motor system of claim 2 wherein:
said electromagnet is disposed centrally with respect to said beam; and
said clamping means comprises a right-hand magnetostrictive brake and a left-hand magnetostrictive brake.

8. The linear motor system of claim 7 wherein said right-hand magnetostrictive brake and said left-hand magnetostrictive brake each comprise a Terfenol-D rod having a conductive coil wound thereon and mounted in a magnetic core.

9. The linear motor system of claim 2 wherein:
said electromagnet is disposed centrally with respect to said beam; and
said clamping means comprises a right-hand piezoelectric brake and a left-hand piezoelectric brake.

10. The linear motor system of claim 1 wherein said beam comprises spring steel.

11. The linear motor system of claim 1 wherein said currents are regulated by pulse width modulation.

12. The linear motor system of claim 11 wherein said currents comprise rectangular current pulses.

13. The linear motor system of claim 11 wherein the currents applied to said excitation means comprise a pulse width modulated sine wave signal and the currents applied to said clamping means comprise approximately rectangular pulses.

* * * * *